US011172292B2

(12) United States Patent
Sekiya et al.

(10) Patent No.: US 11,172,292 B2
(45) Date of Patent: Nov. 9, 2021

(54) VOICE PROCESSING SYSTEM

(71) Applicant: SONY CORPORATION, Tokyo (JP)

(72) Inventors: Toshiyuki Sekiya, Kanagawa (JP);
Hideto Mori, Tokyo (JP); Makoto Hanyuda, Kanagawa (JP); Yu Togasaki, Kanagawa (JP); Yuya Hirano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/816,479

(22) Filed: Mar. 12, 2020

(65) Prior Publication Data

US 2020/0213730 A1 Jul. 2, 2020

Related U.S. Application Data

(63) Continuation of application No. 16/012,473, filed on Jun. 19, 2018, now Pat. No. 10,674,258, which is a
(Continued)

(30) Foreign Application Priority Data

Oct. 20, 2014 (JP) .................................. 2014-213496

(51) Int. Cl.
*H04R 3/00* (2006.01)
*H04M 9/08* (2006.01)
(Continued)

(52) U.S. Cl.
CPC .............. *H04R 3/005* (2013.01); *G10L 15/20* (2013.01); *G10L 21/0208* (2013.01);
(Continued)

(58) Field of Classification Search
CPC . H04R 3/00; H04R 3/005; H04R 1/02; H04R 1/021; H04R 1/08; H04R 1/083;
(Continued)

(56) References Cited

U.S. PATENT DOCUMENTS 5,793,875 A * 8/1998 Lehr ..................... H04R 25/554
381/313
6,091,832 A * 7/2000 Shurman ................ G02C 11/06
2/422
(Continued)

FOREIGN PATENT DOCUMENTS

CN 102393520 A 3/2012
CN 102543099 A 7/2012
(Continued)

OTHER PUBLICATIONS

Apr. 7, 2020, Japanese Office Action issued for related JP Application No. 2019-038212.
(Continued)

*Primary Examiner* — Leshui Zhang
(74) *Attorney, Agent, or Firm* — Paratus Law Group, PLLC

(57) ABSTRACT

There is provided a voice processing system capable of acquiring user voice more clearly, the voice processing system including: a mounting unit configured to be attached to a user. The mounting unit includes at least three voice acquisition units configured to acquire voice data for beamforming.

12 Claims, 8 Drawing Sheets

Related U.S. Application Data continuation of application No. 15/504,063, filed as application No. PCT/JP2015/070040 on Jul. 13, 2015, now Pat. No. 10,306,359.

(51) Int. Cl.
| | |
|---|---|
| H04R 1/02 | (2006.01) |
| H04R 1/40 | (2006.01) |
| G10L 15/20 | (2006.01) |
| G10L 21/0208 | (2013.01) |
| H04R 1/10 | (2006.01) |

(52) U.S. Cl.
CPC ............ H04M 9/082 (2013.01); H04R 1/02 (2013.01); H04R 1/40 (2013.01); H04R 1/406 (2013.01); H04R 3/00 (2013.01); H04R 1/1008 (2013.01); H04R 2201/023 (2013.01); H04R 2430/20 (2013.01); H04R 2499/11 (2013.01)

(58) Field of Classification Search
CPC . H04R 1/10; H04R 1/40; H04R 1/406; H04R 1/46; H04R 1/32; H04R 1/326; H04R 2430/20; H04R 2430/21; H04R 2430/23; H04R 2430/25; H04R 5/0335; H04R 3/10; H04R 3/02; H04R 25/405; H04R 1/00; H04R 1/1008; H04R 2201/023; H04R 2499/11; G10L 15/20; G10L 21/02; G10L 21/0202; G10L 21/0205; G10L 21/0208; H04M 9/08; H04M 9/082; H04M 9/085; H04M 9/087; H04M 9/10
USPC ....... 381/361, 362, 363, 364, 26, 56, 57, 58, 381/60, 61, 312, 313, 320, 321, 322–331, 381/71.1, 71.6, 71.7, 72, 73.1, 74, 91, 92, 381/94.1, 94.2, 98, 99, 100, 101, 103, 381/110, 111, 112, 113, 114, 115, 122, 381/374, 375, 377, 378, 379; 379/3, 379/406.01–406.16; 704/E21.002; 455/569.1, 570, 575.1, 575.2; 700/94
See application file for complete search history.

(56) References Cited

U.S. PATENT DOCUMENTS

| | | | |
|---|---|---|---|
| 9,810,925 B2* | 11/2017 | Fan | .................. H04R 3/005 |
| 2005/0060142 A1 | 3/2005 | Visser et al. | |
| 2007/0167671 A1 | 7/2007 | Miller, III | |
| 2008/0187148 A1 | 8/2008 | Itabashi et al. | |
| 2009/0129620 A1 | 5/2009 | Tagawa et al. | |
| 2009/0136056 A1 | 5/2009 | Franzen | |
| 2010/0202626 A1 | 8/2010 | Shiori et al. | |
| 2012/0051548 A1 | 3/2012 | Visser et al. | |
| 2012/0163625 A1 | 6/2012 | Siotis et al. | |
| 2013/0070935 A1 | 3/2013 | Hui et al. | |
| 2013/0080169 A1* | 3/2013 | Harada | .................. G10L 25/63 |
| | | | 704/249 |
| 2013/0173266 A1 | 7/2013 | Nishino et al. | |
| 2014/0219471 A1 | 8/2014 | Deshpande et al. | |
| 2014/0278394 A1 | 9/2014 | Bastyr et al. | |
| 2014/0334630 A1 | 11/2014 | Harel | |
| 2015/0049892 A1* | 2/2015 | Petersen | .............. H04R 25/554 |
| | | | 381/315 |

FOREIGN PATENT DOCUMENTS

| | | |
|---|---|---|
| CN | 102763160 A | 10/2012 |
| CN | 103024629 A | 4/2013 |
| CN | 103135092 A | 6/2013 |
| CN | 202998463 U | 6/2013 |
| CN | 104105449 A | 10/2014 |
| EP | 2736272 A1 | 5/2014 |
| EP | 2643981 B1 | 9/2014 |
| JP | H02-005996 U | 1/1990 |
| JP | 2005-303574 A | 10/2005 |
| JP | 2013-138353 A | 7/2013 |
| JP | 2013-191996 A | 9/2013 |
| WO | WO 2012/069973 A9 | 5/2012 |

OTHER PUBLICATIONS

Apr. 9, 2018, European Search Report issued for related EP Application No. 15852448.8.

Oct. 1, 2018, European Search Report issued for related EP Application No. 18186728.4.

May 8, 2019, Chinese Office Action issued for related CN Application No. 201810681854.9.

Feb. 6, 2020, Chinese Office Action issued for related CN Application No. 201510612564.5.

* cited by examiner

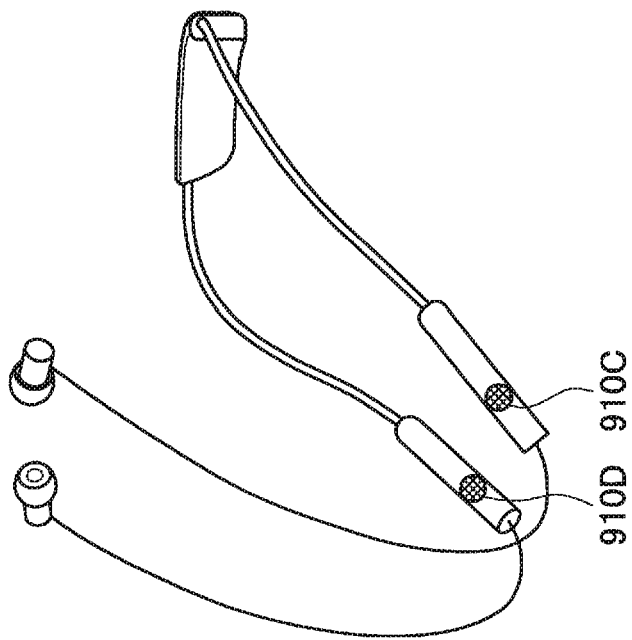
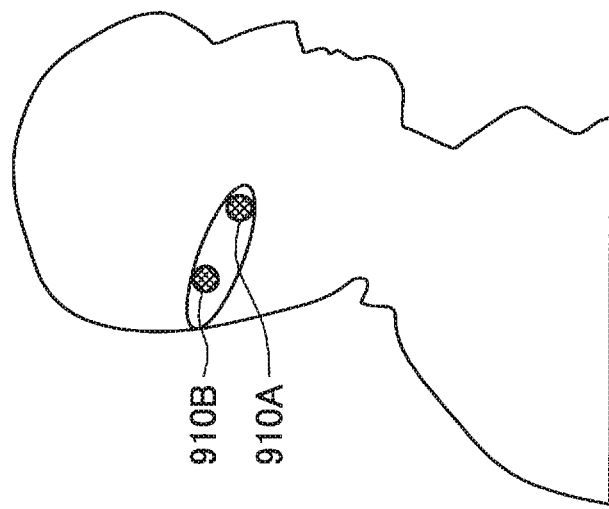
FIG.6

FIG.7
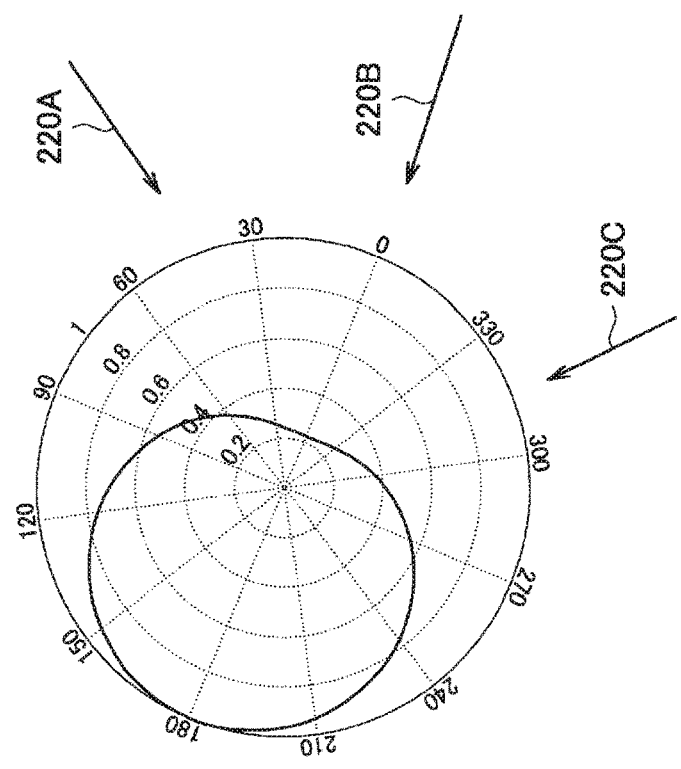
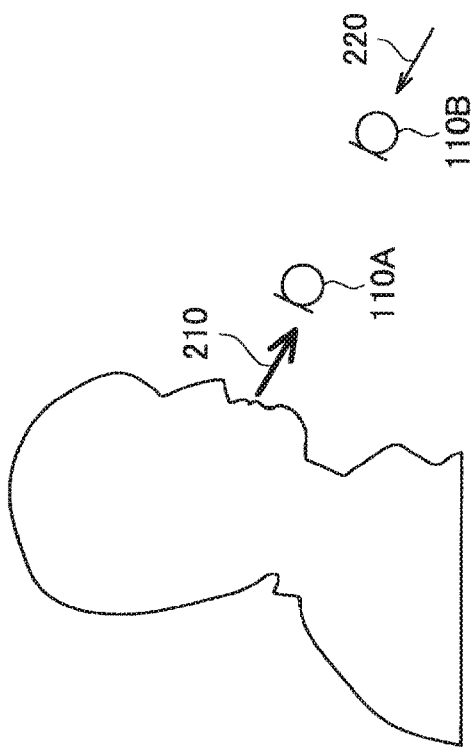

VOICE PROCESSING SYSTEM

CROSS-REFERENCE TO PRIOR APPLICATION

This application is a continuation of U.S. patent application Ser. No. 16/012,473 (filed on Jun. 19, 2018), which is a continuation of U.S. patent application Ser. No. 15/504,063 (filed on Feb. 15, 2017 and issued as U.S. Pat. No. 10,306,359 on May 28, 2019), which is a National Stage Patent Application of PCT International Patent Application No. PCT/JP2015/070040 (filed on Jul. 13, 2015) under 35 U.S.C. § 371, which claims priority to Japanese Patent Application No. 2014-213496 (filed on Oct. 20, 2014), which are all hereby incorporated by reference in their entirety.

TECHNICAL FIELD

The present disclosure relates to a voice processing system.

BACKGROUND ART

In recent years, wearable devices that sense a user's state, capture or record surroundings, and output various information items to the user while being worn on any part of the user's body are becoming widespread. In one example, wearable devices are used in various fields including life log and sports support.

The information acquired by the wearable device can be greatly affected depending on the part to be attached, the user's state, and the surrounding environment. In one example, as for voice, a voice uttered from the user's mouth (also referred to as a "user voice", hereinafter) may be buried in noise including frictional sound between a wearable device and clothes, sound related to vibration, and surrounding environmental sound. Thus, it is desirable to provide a technique of acquiring the user voice more clearly.

In one example, Patent Document 1 discloses technology for acquiring a voice signal with reduced noise and enhanced user voice by performing microphone array processing on a voice signal inputted through each of two microphones provided in a headset.

CITATION LIST

Patent Literature

Patent Literature 1: JP 2005-303574A

DISCLOSURE OF INVENTION

Technical Problem

However, further improvement in performance is desirable in this technical field. Thus, the present disclosure provides a novel and improved voice processing system capable of acquiring the user voice more clearly.

Solution to Problem

According to the present disclosure, there is provided a voice processing system including: a mounting unit configured to be attached to a user. The mounting unit includes at least three voice acquisition units configured to acquire voice data for beamforming.

Advantageous Effects of Invention

According to the present disclosure as described above, it is possible to acquire the user voice more clearly. Note that the effects described above are not necessarily limitative. In conjunction with or in place of the above effects, there may be achieved any of the effects described in this specification or other effects that may be identified from description of this specification.

BRIEF DESCRIPTION OF DRAWINGS

FIG. 6 is a diagram illustrating an example of an appearance configuration of a voice processing system according to a comparative example.

FIG. 7 is a diagram illustrated to describe an arrangement scheme of a voice acquisition unit according to the present embodiment.

MODE(S) FOR CARRYING OUT THE INVENTION

Figure 1:
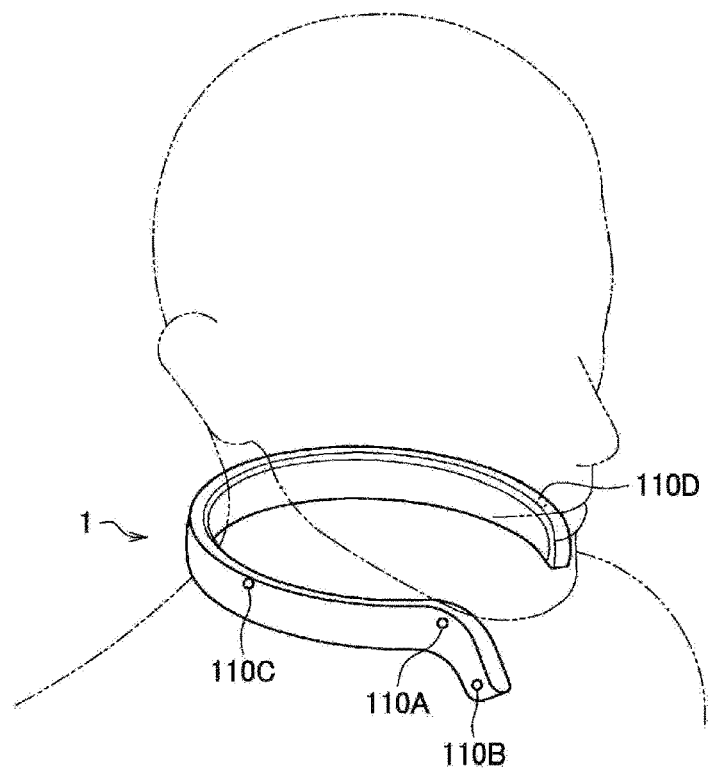
FIG. 1 is a diagram illustrating an example of an appearance configuration of a voice processing system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated description of these structural elements is omitted.

Furthermore, in this specification and the drawings, components having substantially the same functional configuration may be distinguished by attaching different alphabets after the same reference numerals. In one example, like voice acquisition units 110A, 110B, and 11C, a plurality of components having substantially the same functional configuration are distinguished as necessary. However, in a case where it is not necessary to particularly distinguish each of a plurality of components having substantially the same functional configuration, only the same reference numeral is attached. In one example, in the case where it is not necessary to particularly distinguish the voice acquisition units 110A, 110B, and 110C, they are simply referred to as a voice acquisition unit 110.

The description will be given in the following order.
1. Appearance Configuration
2. Arrangement of Voice Acquisition Unit
2-1. Arrangement Scheme
2-2. Practical Arrangement Example
3. Internal Configuration
4. Operation Processing
5. Brief Summary <1. Appearance Configuration>

An appearance configuration of a voice processing system according to an embodiment of the present disclosure will be described with reference to FIGS. 1 to 6.

Figure 2:
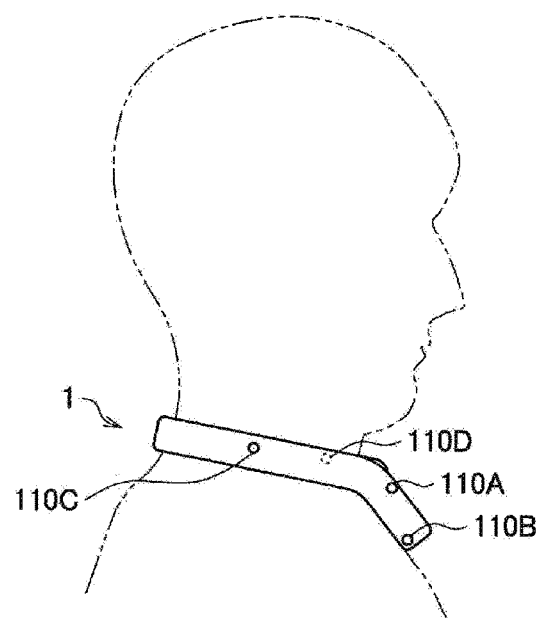
FIG. 2 is a diagram illustrating an example of the appearance configuration of the voice processing system according to the present embodiment.
Figure 3:
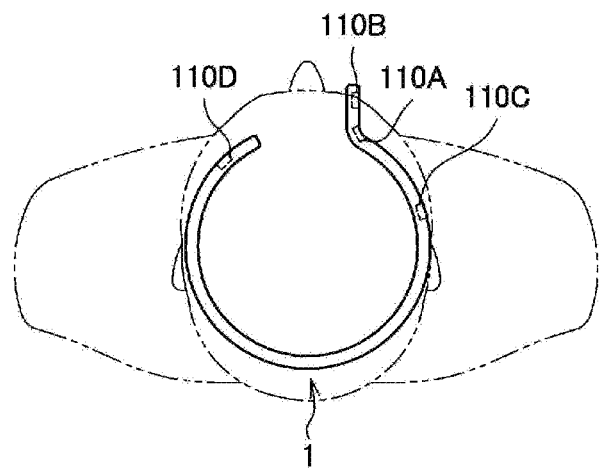
FIG. 3 is a diagram illustrating an example of the appearance configuration of the voice processing system according to the present embodiment.

FIGS. 1 to 3 are diagrams illustrating an example of an appearance configuration of a voice processing system according to the present embodiment. As illustrated in FIGS. 1 to 3, the voice processing system 1 according to the present embodiment has a mounting unit that is shaped to make a half turn around the neck from both sides of the neck to the rear side (back side). Then, the mounting unit is attached to the user by being hooked on the user's neck. Moreover, FIGS. 1 to 3 illustrate views of the state in which the mounting unit is attached to the user from various viewpoints. Specifically, FIG. 1 is a perspective view thereof, FIG. 2 is a perspective view thereof viewed from the right side of the user, and FIG. 3 is a plan view thereof viewed from the upper side of the user.

Figure 8:
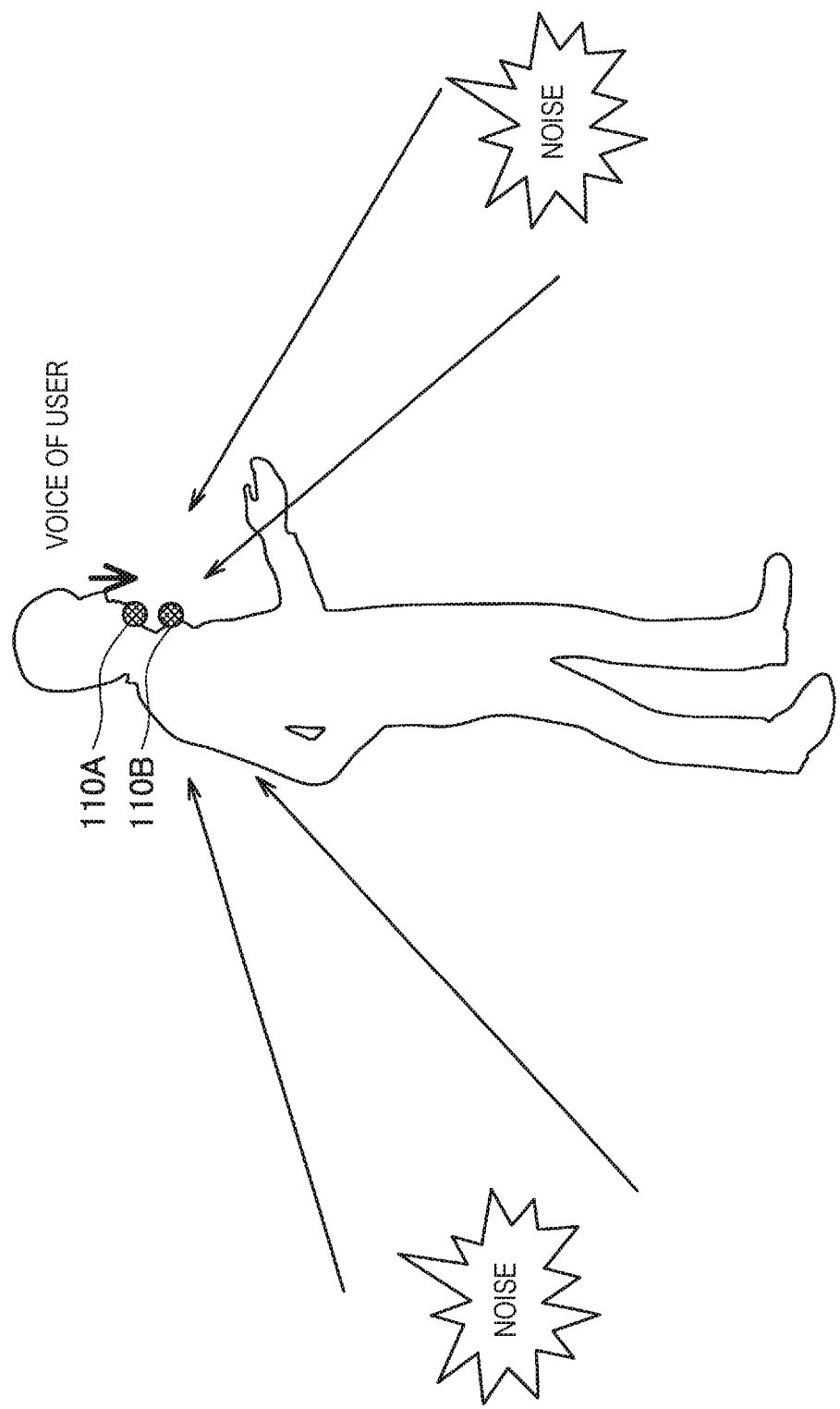
FIG. 8 is a diagram illustrated to describe the arrangement scheme of the voice acquisition unit according to the present embodiment.

Moreover, in this specification, although terms indicating directions such as left, right, upper, lower, fore, and back sides are used, these directions are intended to indicate directions viewed from the center of the user's body (e.g., position of solar plexus) in the upright posture of the user as illustrated in FIG. 8 to be described later. In one example, the term "right side" indicates the direction of the right half of the user, the term "left side" indicates the direction of the left half of the user, the term "upper side" indicates the direction of the head side of the user, and the "lower side" indicates the direction of the feet side of the user. Furthermore, the term "fore side" indicates the direction in which the user's body faces, and the term "back side" indicates the direction of the rear side of the user.

As illustrated in FIGS. 1 to 3, the mounting unit according to the present embodiment may be a neck hanging type that is worn around the user's neck. The mounting unit may be worn in close contact with the user's neck or may be worn with a space between them. An example of another shape of the neck hanging type mounting unit includes a pendant type that is attached to a user with a neck strap and a headset type having a neckband passing along the back side of the neck instead of a headband to be worn on the head.

The usage pattern for the mounting type unit may have a pattern used while being directly worn on the human body. The usage pattern of using while being directly worn refers to a pattern used in a state where no object exists between the mounting type unit and the human body. In one example, this usage pattern corresponds to a case where the mounting unit illustrated in FIGS. 1 to 3 is worn to be in contact with the skin of the user's neck. Furthermore, various usage patterns, such as a headset type and eyeglass type worn directly on the head, can be considered.

The usage pattern of the mounting type unit may be a pattern that is used by being indirectly worn on the human body. The usage pattern of using while being indirectly worn refers to a pattern used in a state in which an object exists between the mounting type unit and the human body. In one example, this usage pattern corresponds to the case where the mounting unit illustrated in FIGS. 1 to 3 is worn to be in contact with the user from above the clothes, such as being worn to be hidden under the collar of the shirt. Furthermore, various patterns, such as a pendant type to be attached to a user with a neck strap and a broach type to be fastened to clothes with fasteners, can be considered.

The mounting unit has a plurality of voice acquisition units 110 (110A, 110B, 110C, and 110D) as illustrated in FIGS. 1 to 3. The voice acquisition unit 110 acquires voice data, such as a voice of the user, a voice uttered by a user's conversation partner, and ambient environmental sound. The voice data acquired by the voice acquisition unit 110 is a target to be subject to beamforming processing for making user's voice clear, for making a voice uttered by a user's conversation partner clear, and for reducing other noise. As illustrated in FIGS. 1 to 3, in the case where the voice acquisition unit is provided on a portion that does not face the user side (e.g., a surface opposite to a surface that is in contact with the user) so that the voice acquisition unit is not directly in contact with the user. Thus, it is possible to reduce the influence of noise caused by the friction between the neck and the mounting unit. Moreover, FIGS. 1 to 3 illustrate the configuration in which four voice acquisition units 110 are provided in the mounting unit, but the present technology is not limited to this example. In one example, the mounting unit may have at least three voice acquisition units, and may have five or more voice acquisition units.

The voice processing system 1 according to the present embodiment may be implemented as a single mounting unit or may be implemented as a combination of a plurality of devices. In one example, the voice processing system 1 may be implemented as a combination of a neck hanging type mounting unit illustrated in FIGS. 1 to 3 and a wristband type mounting unit that is worn on the user's arm. Then, the voice processing system 1 may perform beamforming processing using voice data acquired by a plurality of voice acquisition units provided in a plurality of devices. In the following description, the voice processing system 1 is assumed to be implemented as a single mounting unit illustrated in FIGS. 1 to 3.

Figure 4:
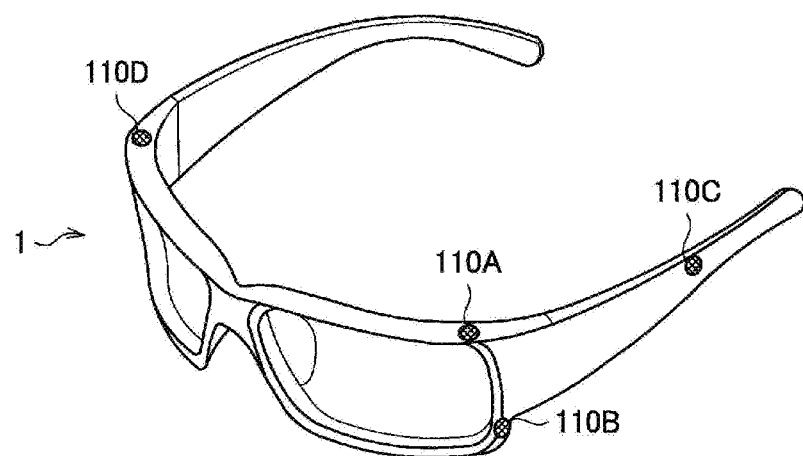
FIG. 4 is a diagram illustrating another example of the appearance configuration of the voice processing system according to the present embodiment.
Figure 5:
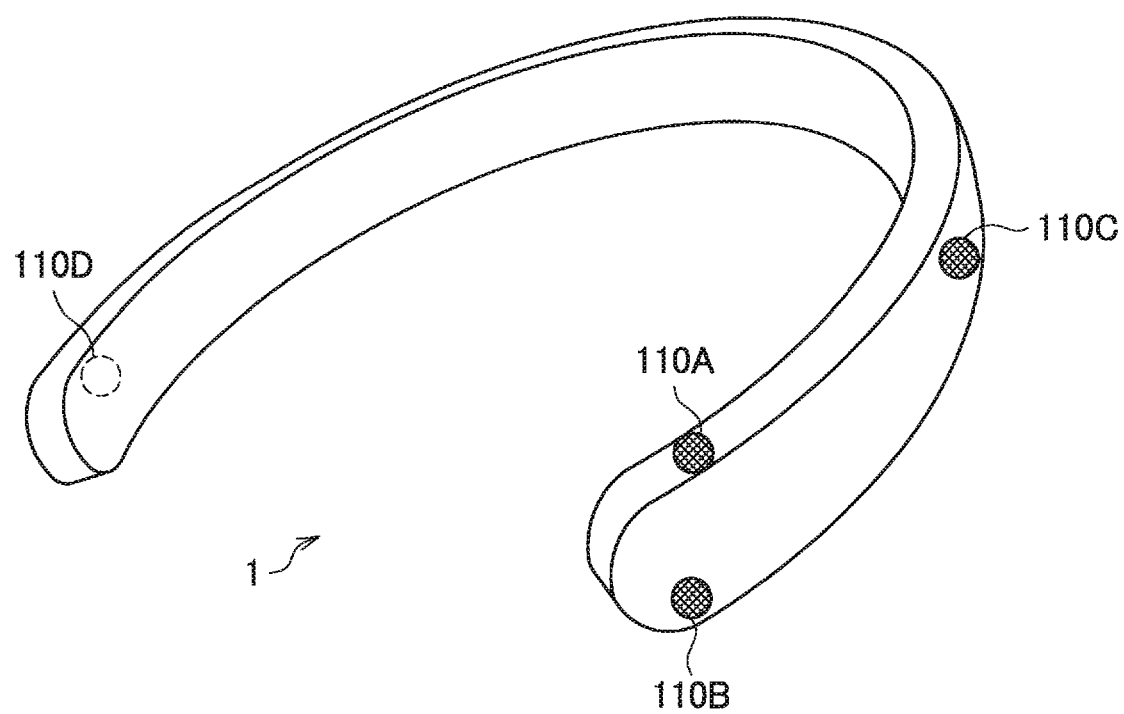
FIG. 5 is a diagram illustrating another example of the appearance configuration of the voice processing system according to the present embodiment.

Other examples of the mounting unit are illustrated in FIGS. 4 and 5. FIGS. 4 and 5 are diagrams illustrating another example of the appearance configuration of the voice processing system according to the present embodiment. FIG. 4 illustrates the appearance configuration of a voice processing system 1 that includes a single glasses type mounting unit. FIG. 5 illustrates the appearance configuration of a voice processing system 1 that includes a single neckband type mounting unit. In the examples illustrated in FIGS. 4 and 5, the voice processing system 1 has a plurality of voice acquisition units 110 (110A, 110B, 110C, and 110D) similarly to the examples illustrated in FIGS. 1 to 3.

A comparative example will be described with reference to FIG. 6. FIG. 6 is a diagram illustrating an example of an appearance configuration of a voice processing system according to the comparative example. The left and right views of FIG. 6 illustrate an appearance configuration example of a so-called Bluetooth (registered trademark) headset. In the example illustrated in the left view of FIG. 6, the voice processing system according to the comparative example has two voice acquisition units 910 (910A and 910B), and is attached to the user by putting it on the user's right ear. In the example illustrated in the right view of FIG.

6, the voice processing system according to the comparative example has two voice acquisition units 910 (910C and 910D) provided symmetrically on cables connected to the left and right earphones. In this way, both the examples illustrated in the left and right views of FIG. 6 have two voice acquisition units.

In the wearable device, in some cases, the microphone and the user's mouth are apart from each other in use, and the user's voice is buried in the noise. It is difficult to solve such a problem even if the beamforming processing using the voice data acquired by the two voice acquisition units as in the comparative example is performed.

Thus, in the present embodiment, an arrangement of the voice acquisition unit 110 is developed to improve noise reduction performance in the case where noise is reduced by the beamforming processing.

<2. Arrangement of Voice Acquisition Unit>

[2-1. Arrangement Scheme]

The arrangement scheme of the voice acquisition unit 110 will be described with reference to FIGS. 7 to 10.

FIG. 7 is a diagram illustrated to describe an arrangement scheme of the voice acquisition unit 110 according to the present embodiment. As illustrated in the left view of FIG. 7, the first arrangement scheme is to arrange the voice acquisition unit 110 linearly with respect to a direction 210 in which the target sound arrives. Furthermore, as illustrated in the left view of FIG. 7, the second arrangement scheme is to arrange the voice acquisition unit 110 linearly with respect to a direction 220 in which the noise to be reduced arrives. In the present embodiment, the voice acquisition units 110A and 110B can be arranged linearly with respect to the direction 210 of the user's mouth, which is the direction in which the user's voice regarded as target sound arrives. In accordance with the first and second arrangement schemes, it is possible to reduce efficiently the noise component coming from the opposite direction 220. This is because the phase difference (time difference) until the user's voice coming from the direction 210 of the user's mouth reaches the voice acquisition units 110A and 110B is large, and the phase difference until the voice coming from the opposite direction 220 reaches the voice acquisition units 110B and 110A is also large. As shown by the polar pattern illustrated on the right side of FIG. 7, the user voice coming from the direction 210 of the user's mouth is enhanced by the beamforming processing to be performed by the controller 160 to be described later, and noise components coming from the opposite directions 220A, 220B, and 220C are reduced.

The arrangement scheme of the voice acquisition unit 110 associated with the direction in which the noise to be reduced arrives will be described in detail with reference to FIG. 8.

FIG. 8 is a diagram illustrated to describe the arrangement scheme of the voice acquisition unit 110 according to the present embodiment. As illustrated in FIG. 8, in the present embodiment, the third arrangement scheme is to arrange the voice acquisition units 110A and 110B linearly with respect to the lower side direction. Assuming that the voice processing system 1 is used outdoors, most of the noise occurred from the outside arrives from the direction of the ground (lower side direction) or the horizontal direction using the user's mouth illustrated in FIG. 8 as the reference. Moreover, the noise coming from the direction of the ground is also called road noise. In accordance with this arrangement scheme, the voice acquisition unit 110 is arranged linearly with respect to the lower side direction in which the road noise arrives, and thus the road noise can be reduced efficiently by the beamforming processing. Furthermore, in accordance with this arrangement scheme, for noise coming from an oblique direction between the lower side direction and the horizontal direction, there is a phase difference until the noise reaches the voice acquisition units 110B and 110A, and thus the beamforming processing can reduce the noise. In this way, in accordance with this arrangement scheme, it is possible to reduce efficiently noise in outdoor environments. Moreover, in some cases, reduction may be difficult for propeller sound of a helicopter, sound from a liquid crystal display installed above the head, and the like. Undoubtedly, depending on the shape of the mounting unit, the voice acquisition units 110A and 110B are not necessarily arranged strictly linearly in the lower side direction (perpendicular direction), or they may be arranged to be inclined.

Next, the arrangement scheme in the case where four or more voice acquisition units 110 are provided will be described in detail with reference to FIGS. 9 and 10.

Figure 9:
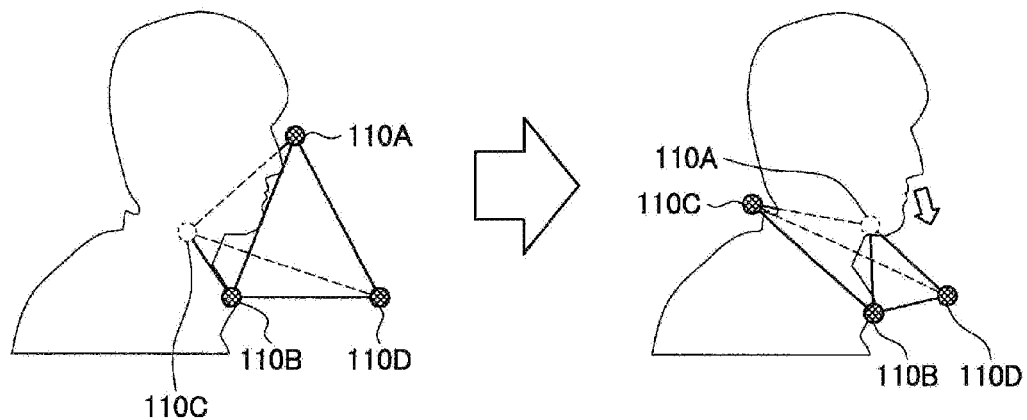
FIG. 9 is a diagram illustrated to describe the arrangement scheme of the voice acquisition unit according to the present embodiment.

FIG. 9 is a diagram illustrated to describe the arrangement scheme of the voice acquisition unit 110 according to the present embodiment. As illustrated in the left view of FIG. 9, in the present embodiment, the fourth arrangement scheme is to arrange a plurality of voice acquisition units 110 three-dimensionally. Specifically, the shape formed by interconnecting positions where four voice acquisition units 110 are provided is three-dimensional. Moreover, the term "three-dimensional" can be regarded as the case where three voice acquisition units 110 are provided and the remaining one voice acquisition unit 110 is not provided on a plane including the positions of the three voice acquisition units 110. In such a three-dimensional arrangement, a phase difference occurs in the voice data acquired by any two or more voice acquisition units 110 for any voice coming from any direction, and thus it is possible to reduce the noise coming from any direction. Furthermore, as illustrated in the left view of FIG. 9, the shape formed by interconnecting the positions where the four voice acquisition units 110 are provided is a regular tetrahedron. The shape formed by interconnecting the positions where the plurality of voice acquisition units 110 are provided is desirable to be a regular polyhedron such as a regular tetrahedron in which the distances from each of the voice acquisition units 110 to the user's mouth are equally spaced. As illustrated in the right view of FIG. 9, the shape formed by interconnecting the positions where the four voice acquisition units 110 are provided undoubtedly may be a tetrahedron, but not necessarily a regular tetrahedron, depending on the shape of the mounting unit.

Figure 10:
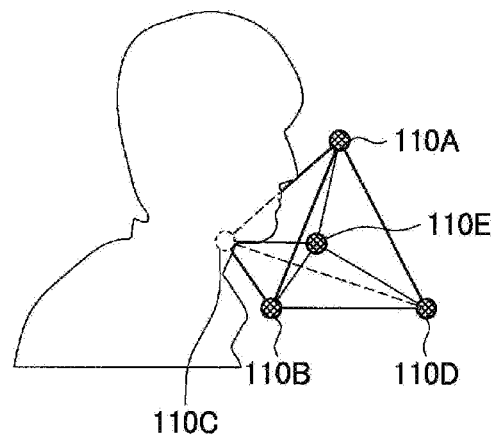
FIG. 10 is a diagram illustrated to describe the arrangement scheme of the voice acquisition unit according to the present embodiment.

FIG. 10 is a diagram illustrated to describe the arrangement scheme of the voice acquisition unit 110 according to the present embodiment. As illustrated in FIG. 10, in the present embodiment, the fifth arrangement scheme is to bring at least one of the voice acquisition units 110 close to the user's mouth. In accordance with this arrangement scheme, at least one voice acquisition unit 110 can acquire the user voice having a larger sound volume than other noises. This makes it possible to increase further the effect of the user voice enhancement by the beamforming processing. In one example, as illustrated in FIG. 10, a fifth voice acquisition unit 110E may be provided at a position closer to the user's mouth than the four voice acquisition units 110 forming a tetrahedron. In addition, in one example, as illustrated in the right view of FIG. 9, one (the voice acquisition unit 110A in the example illustrated in the right view of FIG. 9) of the voice acquisition units 110 located at the vertexes of the tetrahedron may be provided closest to the user's mouth.

The arrangement scheme of the voice acquisition unit 110 has been described above.

[2-2. Practical Arrangement Example]

Subsequently, referring again to FIGS. 1 to 3, a practical arrangement example of the voice acquisition unit 110 in accordance with the above-mentioned arrangement schemes will be described. Moreover, the practical arrangement of the voice acquisition unit 110 may not necessarily completely conform to the arrangement scheme described above due to the constraint conditions such as the shape of the mounting unit and the weight of each component.

The first arrangement scheme will be described. As illustrated in FIG. 2, in a state where the mounting unit is attached to the user, the voice acquisition unit 110A and the voice acquisition unit 110B are arranged in the same direction when viewed from the user's mouth. Furthermore, in the state where the mounting unit is attached to the user, the distance between the voice acquisition unit 110A (a first voice acquisition unit) included in the four voice acquisition units 110 and the user's mouth and the distance between the voice acquisition unit 110B (a second voice acquisition unit) included in the four voice acquisition units 110 and the user's mouth are set to be different from each other. In this way, in the examples illustrated in FIGS. 1 to 3, the voice acquisition units 110A and 110B are arranged linearly with respect to the direction of the user' mouth at which the target sound arrives, and thus it is possible to enhance efficiently the user voice by the beamforming processing.

Next, the second and third arrangement schemes will be described. As illustrated in FIG. 2, in the state where the mounting unit is attached to the user, the voice acquisition unit 110A and the voice acquisition unit 110B are arranged in the same direction when viewed from the user's mouth. Furthermore, in a state where the mounting unit is attached to the user, the voice acquisition unit 110A (the first voice acquisition unit) and the voice acquisition unit 110B (the second voice acquisition unit) are provided to be closer to the user's feet than the user's mouth in the user's upright posture. In this way, in the examples illustrated in FIGS. 1 to 3, the voice acquisition units 110A and 110B are arranged linearly with respect to the direction of the ground where the noise to be reduced arrives, and thus it is possible to reduce efficiently the noise by the beamforming processing.

Next, the fourth arrangement scheme will be described. As illustrated in FIGS. 1 to 3, the shape formed by interconnecting the positions at which the voice acquisition units 110A, 110B, 110C, and 110D are provided is three-dimensional. In this way, in the example illustrated in FIGS. 1 to 3, the plurality of voice acquisition units 110 are arranged three-dimensionally, and thus it is possible to reduce the noise coming from any direction by the beamforming processing.

Next, the fifth arrangement scheme will be described. As illustrated in FIGS. 1 to 3, in a state in which the mounting unit is attached to the user, the voice acquisition unit 110A (the first voice acquisition unit) is provided at a position closest to the user's mouth. In this way, in the examples illustrated in FIGS. 1 to 3, the voice acquisition unit 110A is provided at a position close to the user's mouth, and thus it is possible to acquire the user voice having a larger sound volume than other noises. Furthermore, with regard to the second and third arrangement conditions, in a state in which the mounting unit is attached to the user, the voice acquisition unit 110B (the second voice acquisition unit) is provided closer to the feet side of the user than the voice acquisition unit 110A (the first voice acquisition unit) that is provided closest to the user's mouth in the user's upright posture. This makes it possible to achieve both the effect of the user's voice enhancement and the noise reduction in the examples illustrated in FIGS. 1 to 3. In the examples illustrated in FIGS. 1 to 3, the voice acquisition unit 110A is provided closer to the lower side than the user's mouth, but the voice acquisition unit 110A may be provided closer to the upper side than the user's mouth.

The arrangement of the voice acquisition unit 110 in the voice processing system 1 according to the present embodiment has been described above. Subsequently, the internal configuration of the voice processing system 1 according to the present embodiment will be described with reference to FIG. 11.

<3. Internal Configuration>

Figure 11:
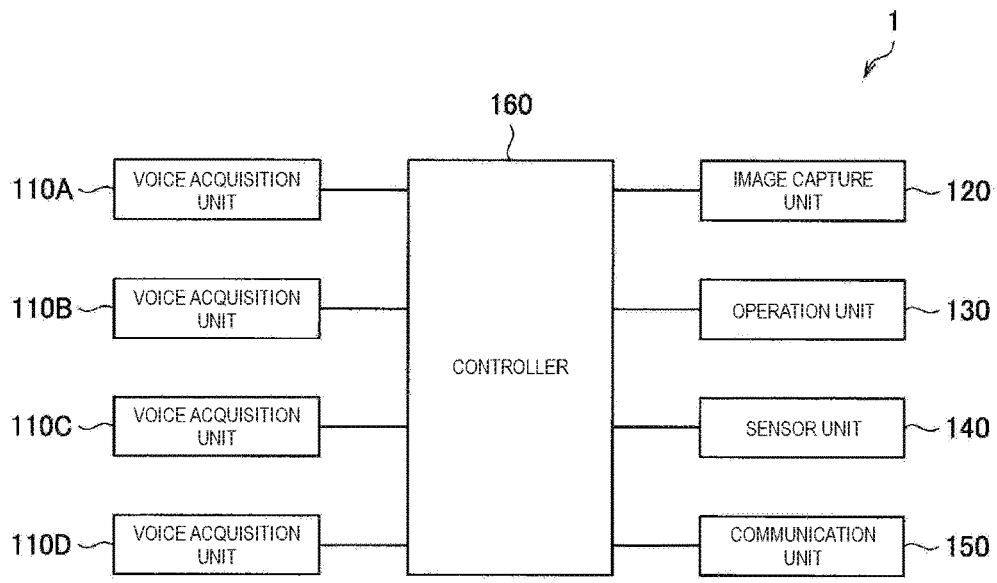
FIG. 11 is a block diagram illustrating an example of an internal configuration of the voice processing system according to the present embodiment.

FIG. 11 is a block diagram illustrating an example of the internal configuration of the voice processing system 1 according to the present embodiment. As illustrated in FIG. 11, the voice processing system 1 is configured to include voice acquisition units 110A to 110D, an image capture unit 120, an operation unit 130, a sensor unit 140, a communication unit 150, and a controller 160.

(1) Voice Acquisition Unit 110

The voice acquisition unit 110 has a function of acquiring voice data for beamforming. In one example, the voice acquisition unit 110 acquires the user voice uttered by a user who wears the voice processing system 1 (the mounting unit) or acquires surrounding sound. In one example, the voice acquisition unit 110 is implemented as a microphone. The voice acquisition unit 110 may be provided in one mounting unit, may be provided in a device separate from the mounting unit, or may be distributed in a plurality of devices. In one example, the voice acquisition unit 110 may be provided in wristband type mounting units, eyeglass type mounting units, and smartphones, in addition to the neck hanging type mounting unit illustrated in FIGS. 1 to 3.

The voice acquisition unit 110 is not necessarily a directional microphone. In one example, the voice acquisition unit 110 may be a microphone having omnidirectional sensitivity. The term "omnidirectional sensitivity" means that there is no region (orientation) of insensitivity in the polar pattern. Such a microphone may also be referred to as a semi-directional microphone. Furthermore, the voice acquisition unit 110 may be a microphone whose sensitivity is uniform or substantially uniform in all directions. The term "uniform or substantially uniform in all directions" means that the sensitivity has a circular polar pattern, but it is not necessarily a true circle. In other words, the voice acquisition unit 110 may be an omnidirectional microphone.

The voice acquisition unit 110 may include a microphone amplifier circuit or an analog-to-digital (A/D) converter that amplifies the voice signal acquired by the microphone. The voice acquisition unit 110 outputs the acquired voice data to the controller 160.

(2) Image Capture Unit 120

The image capture unit 120 is configured to include a lens system, a driving system, and a solid-state image sensor array. The lens system includes an image capture lens, a diaphragm, a zoom lens, a focus lens, and the like. The driving system causes a lens system to perform a focusing operation or a zooming operation. The solid-state image sensor array converts light for image capturing obtained by the lens system into electric energy to generate an image capture signal. The solid-state image sensor array may be implemented as, in one example, a charge coupled device (CCD) sensor array or a complementary metal-oxide-semiconductor (CMOS) sensor array. In one example, the image capture unit 120 may be provided to be capable of capturing the fore side of the user in a state in which the voice processing system (the mounting unit) 1 is attached to the user. In this case, the image capture unit 120 can capture an image of the user's conversation partner, in one example. Furthermore, the image capture unit 120 may be provided to be capable of capturing an image of the user's face in the state where the voice processing system 1 is attached to the user. In this case, the voice processing system 1 can specify the position of the user's mouth from the captured image. The image capture unit 120 outputs data of the captured image composed of digital signals to the controller 160.

(3) Operation Unit 130

The operation unit 130 is operated by the user and has a function of receiving an input from the user. In one example, the operation unit 130 may be implemented as a camera button that receives an input for instructing the image capture unit 120 to capture a still image, an input for instructing to start or stop capturing a moving image. Furthermore, the operation unit 130 may be implemented as a voice input button that receives an input for instructing the voice acquisition unit 110 to start or stop inputting the voice. Furthermore, the operation unit 130 may be implemented as a touch slider that receives a touch operation or a slide operation. Furthermore, the operation unit 130 may be implemented as a power button that accepts an operation for instructing the voice processing system 1 to turn the power ON or OFF. The operation unit 130 outputs information that indicates user input to the controller 160.

(4) Sensor Unit 140

The sensor unit 140 has a function of sensing the state or the surrounding state of the user wearing the voice processing system 1. In one example, the sensor unit 140 may include at least one of an accelerometer, a speedometer, a gyro sensor, a geomagnetic sensor, a global positioning system (GPS) module, and a vibration sensor. The sensor unit 140 may be provided in a device separate from the mounting unit, or may be provided in a distributed manner in a plurality of devices. In one example, the wristband type device may be provided with a pulse rate meter, and the smartphone may be provided with a vibration sensor. The sensor unit 140 outputs information indicating a result obtained by sensing to the controller 160.

(5) Communication Unit 150

The communication unit 150 is a communication module for exchanging data between the voice processing system 1 and other devices by wired or wireless connection. The communication unit 150 directly communicates, or wirelessly communicate via a network access point, with an external device, using a communication scheme such as wired local area network (LAN), wireless LAN, wireless fidelity (Wi-Fi, registered trademark), infrared communication, Bluetooth, and near field communication (NFC).

In one example, in a case where a function of serving as the controller 160 to be described later is included in other devices such as a smartphone or a server on the cloud, the communication unit 150 may transmit data acquired by the voice acquisition unit 110, the image capture unit 120, the operation unit 130, and the sensor unit 140. In this case, the other device performs beamforming processing, voice recognition processing, and the like. In addition, in one example, in a case where the voice acquisition unit 110, the image capture unit 120, the operation unit 130, or the sensor unit 140 is provided in a separate device, the communication unit 150 may receive the data acquired by them and output it to the controller 160. Furthermore, the communication unit 150 may transmit the voice data obtained after the beamforming processing by the controller 160 to a storage device for storing the voice data.

(6) Controller 160

The controller 160 functions as both an arithmetic processing unit and a controller, and controls the overall operation in the voice processing system 1 in accordance with various programs. The controller 160 is implemented as an electronic circuit such as a central processing unit (CPU) and a microprocessor. Moreover, the controller 160 may include read-only memory (ROM) for storing programs to be used, calculation parameters, or the like, and may include random-access memory (RAM) for temporarily storing appropriately varying parameters, or the like.

In one example, the controller 160 performs beamforming processing of forming the directivity to acquire a voice coming from the direction of the user's mouth using a plurality of voice data items acquired by the voice acquisition unit 110. The beamforming processing is a process of changing the degree of enhancement for each area where sound arrives. More specifically, the beamforming processing performed by the controller 160 may include a process of reducing sound coming from a specific area, or may include a process of enhancing sound coming from a desired orientation. In one example, the controller 160 may regard a voice coming from a direction other than the direction of the user's mouth as noise to be reduced. Furthermore, the controller 160 may enhance a voice coming from the direction of the user's mouth. As described above, the voice acquisition unit 110 does not necessarily have its own directivity. The controller 160 controls the directivity by performing the beamforming processing on the voice data acquired by each of the voice acquisition units 110. The controller 160 can perform the beamforming processing using the phase difference between the voice data items acquired by each of the voice acquisition units 110.

The controller 160 can control the beamforming processing from various viewpoints. In one example, the controller 160 may control the direction and/or the range of forming the directivity from the viewpoint described below as an example.

In one example, the controller 160 may control the beamforming processing based on the positional relationship between a noise source and the voice acquisition unit 110. In one example, as described above, the noise source of a road is the ground, and thus the controller 160 may control the beamforming processing to reduce a voice coming from the direction of the ground. Furthermore, in one example, in a case where it can be determined that there is a road or a line having a large traffic volume in a specific direction from the positional information, the controller 160 may control the beamforming processing to reduce the sound from the direction. In addition, in a case where there is a user instruction to specify the position of the noise source in one example, the controller 160 may control the beamforming processing to reduce the sound coming from the position indicated by the user instruction.

In one example, the controller 160 may control the beamforming processing based on the position of a speaker other than the user. In one example, the controller 160 may perform beamforming processing for enhancing a voice coming from a speaker other than the user. Furthermore, the controller 160 may perform beamforming processing for reducing a voice coming from another speaker other than the user. It is considered that there are various ways to specify the existence or position (direction) of other speakers than the user. In one example, in a case where a voice is acquired from a direction other than the user, the controller 160 may determine that there is another speaker and specify the direction. Furthermore, in a case where it is recognized that the voice of another speaker is acquired by voice recognition, the controller 160 may determine that another speaker is present. Furthermore, the controller 160 may specify the existence and the position of another speaker based on a result of image recognition on the captured image obtained by the image capture unit 120. Furthermore, the controller 160 may compare the information on the position of the user acquired by the GPS module included in the sensor unit 140 with the information on the position of the other speaker, thereby specifying the existence and the position of the other speaker. Furthermore, the controller 160 may specify the existence and the position of the other speaker by measuring the radio wave intensity of radio waves (e.g., the radio field strength of Wi-Fi) emitted from a device held by the other speaker.

In one example, the controller 160 may control the beamforming processing based on information indicating the state of the user. The state of the user may refer to a motion state, such as when the user is running, walking, or riding a vehicle. In one example, the controller 160 can estimate the motion state of the user in accordance with the sensing result acquired by the sensor unit 140. The controller 160 may estimate the detailed motion state by combining a plurality of sensing results. In one example, the combination of the sensing results obtained by the vibration sensor and the speedometer allows the controller 160 to estimate that the state is in bicycling if it is determined that the vibration level and velocity are larger than when walking. In addition, the controller 160 may estimate that the state is in riding in an automobile if the vibration level is lower than the case of riding a bicycle and the velocity is higher than the case of riding a bicycle. Then, the controller 160 may enlarge or reduce the range of directivity to be formed depending on the estimated motion state of the user. In one example, if the intensity of motion indicated by the motion state (e.g., numerical values outputted from each sensor) is relatively large, the controller 160 may increase the range of directivity, as compared with the case where the motion is small. Moreover, the enlargement or reduction of the range of directivity may be regarded as enlarging or reducing the range of an area indicating the sensitivity equal to or higher than a predetermined value with respect to the incoming sound. In addition, the state of the user may indicate the user's body posture such as the orientation and posture of the face of the user. In one example, the controller 160 may estimate the orientation of the user's face based on a result of image recognition on the captured image obtained by the image capture unit 120, and may control the orientation of directivity depending on the orientation. In this case, even when the orientation of the face changes and the positional relationship between the user's mouth and the voice acquisition unit 110 changes, the controller 160 can control the directivity to acquire clearly a voice uttered from the mouth.

Furthermore, the controller 160 may perform processing in accordance with the result of voice recognition executed based on the voice data obtained by performing the beamforming processing. The voice recognition processing may be executed by the controller 160 or may be executed by another device such as a server on the cloud. In one example, the controller 160 may control the operation of the voice processing system 1 based on a result of voice recognition. Specifically, the controller 160 may control the directivity associated with the beamforming processing based on the result of voice recognition. This makes it possible for the user to instruct by voice, in one example, to direct the directivity in the direction of the voice to be recorded. In addition, the controller 160 may start or stop the image capturing with the camera, or record a specific sensing result, based on the result of voice recognition. This makes it possible for the user to instruct by voice, in one example, the landscape or motion state to be recorded.

Moreover, the controller 160 can be implemented as, in one example, a mobile processor. As described above, the controller 160 may be included in the mounting unit, or may be included in any other device such as a smartphone or a server on the cloud.

(7) Others

In addition, the voice processing system 1 can have various components. In one example, the voice processing system 1 may have a battery. As illustrated in FIGS. 1 to 3, the mounting unit can have a curved shape, and thus it is desirable that the battery may be a curved battery having a curved surface. Furthermore, the voice processing system 1 may have a connector for charging to which a cable for charging the battery can be connected. The connector for charging may be a connector for both charging and communication, which has a function as a connector for communication capable of connecting a cable for communication. Furthermore, the voice processing system 1 may have a vibrator that functions as an output device for the user. Furthermore, the voice processing system 1 may have a loudspeaker that functions as an output device to the user. Furthermore, the voice processing system 1 may have an earphone connector capable of connecting an earphone that functions as an output device to the user. The earphone connector may have a magnetic force, and the earphone connector and the earphone may be detachable by a magnetic force. Furthermore, the voice processing system 1 may have a storage unit for storing the voice data after the beamforming processing by the controller 160.

The internal configuration of the voice processing system 1 according to the present embodiment has been described above. Next, an operation process of the voice processing system 1 according to the present embodiment will be described with reference to FIG. 12.

<4. Operation Processing>

Figure 12:
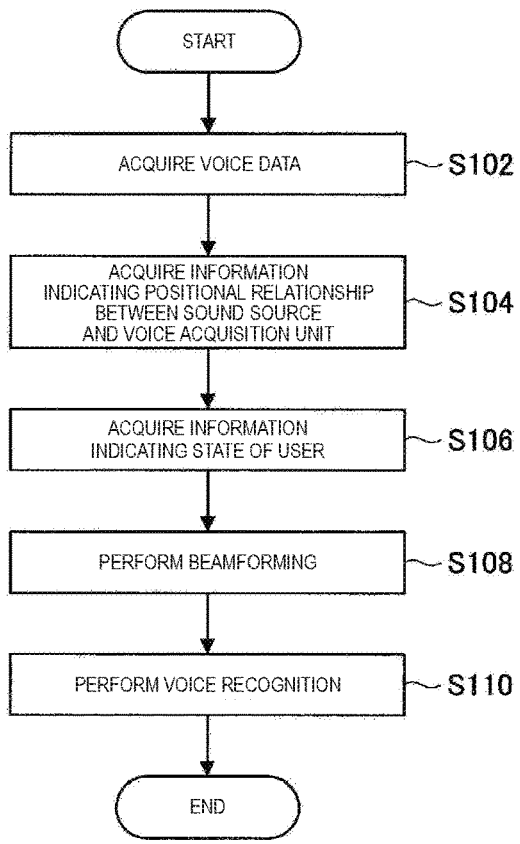
FIG. 12 is a flowchart illustrating an example of a voice signal processing procedure executed in the voice processing system according to the present embodiment.

FIG. 12 is a flowchart illustrating an example of a voice signal processing procedure executed in the voice processing system 1 according to the present embodiment.

As illustrated in FIG. 12, in step S102, the voice processing system 1 acquires voice data. In one example, the voice acquisition units 110A, 110B, 110C, and 110D acquire voice data and output it to the controller 160.

Next, in step S104, the voice processing system 1 acquires information indicating the positional relationship between a sound source and the voice acquisition unit 110. The sound source may be a noise source, a user's mouth that is a source of user's voice, or a speaker other than the user. The controller 160 acquires information indicating the positional relationship between the sound source and the voice acquisition unit 110, specifically, information indicating the direction viewed from the voice acquisition unit 110. Examples of such information include a result of voice recognition on a voice acquired by the speech acquisition unit 110, a result of image recognition on a captured image obtained by the image capture unit 120, information indicating a user input acquired by the operation unit 130, a sensing result by the sensor unit 140, and information acquired from another device through the communication unit 150.

Next, in step S106, the voice processing system 1 acquires information indicating the state of the user. In one example, the controller 160 acquires information indicating the user's motion state or the user's body posture. Examples of such information include a result of voice recognition on a voice acquired by the speech acquisition unit 110, a result of image recognition on a captured image obtained by the image capture unit 120, information indicating a user input acquired by the operation unit 130, a sensing result by the sensor unit 140, and information acquired from another device through the communication unit 150.

Then, in step S108, the voice processing system 1 performs beamforming processing. In one example, the controller 160 performs the beamforming processing of forming directivity for acquiring a voice coming from the direction of the user's mouth, using the plurality of voice data items acquired in step S102. In this case, the controller 160 may control the beamforming processing to reduce the noise based on the positional relationship between the noise source and the voice acquisition unit 110. Furthermore, the controller 160 may perform beamforming processing for enhancing or reducing a voice coming from a speaker other than the user based on the position of a speaker other than the user. Furthermore, the controller 160 may control the direction and/or range of forming the directivity depending on the state of the user.

Then, in step S110, the voice processing system 1 performs voice recognition processing. In one example, the controller 160 executes the voice recognition processing based on the voice data obtained by performing the beamforming processing. Then, the controller 160 may control the operation of the voice processing system 1 depending on a result obtained by performing the voice recognition.

An example of the voice signal processing procedure executed in the voice processing system 1 has been described above.

<5. Brief Summary>

The embodiments of the present disclosure have been described in detail above with reference to FIGS. 1 to 12. As described above, the voice processing system 1 according to the present embodiment has at least three voice acquisition units in the mounting unit. This makes it possible for the voice processing system 1 to acquire voice data suitable for performing beamforming processing for making the user's voice more clear.

Although the preferred embodiment(s) of the present disclosure has/have been described in detail above with reference to the accompanying drawings, the technical scope of the present disclosure is not limited to the above examples. A person skilled in the art may find various alterations and modifications within the scope of the technical idea described in the claims, and it should be understood that they will naturally come under the technical scope of the present disclosure.

The series of processes carried out by each device described in the present specification may be implemented by using software, hardware, or a combination of software and hardware. Programs that constitute the software may be stored previously, in one example, on storage medium (non-transitory media) provided inside or outside each device. In one example, such program is loaded onto random access memory (RAM) in executing it by a computer and executed by a processor such as CPU.

Furthermore, the processes described with reference to the flowcharts and sequence diagrams herein are not necessarily executed in the order illustrated. Some processing steps may be executed in parallel. Furthermore, some of additional steps can be employed, or some others can be omitted.

Furthermore, the effects described in this specification are merely illustrative or exemplary, and are not restrictive. That is, the technology according to the present disclosure may achieve other effects that are obvious to those skilled in the art from the description of this specification in conjunction with or in place of the above effects.

Additionally, the present technology may also be configured as below.

(1)
A voice processing system including:
a mounting unit configured to be attached to a user,
wherein the mounting unit includes at least three voice acquisition units configured to acquire voice data for beamforming.

(2)
The voice processing system according to (1),
wherein the mounting unit includes at least four voice acquisition units, and the four voice acquisition units form a three-dimensional shape by interconnecting positions at which the four voice acquisition units are provided.

(3)
The voice processing system according to (1) or (2),
wherein, in a state in which the mounting unit is attached to the user, the four voice acquisition units are provided so that a distance between a first voice acquisition unit included in the four voice acquisition units and a mouth of the user is different from a distance between a second voice acquisition unit included in the four voice acquisition units and the mouth of the user.

(4)
The voice processing system according to (3),
wherein, in a state in which the mounting unit is attached to the user,
the first voice acquisition unit is provided at a position closest to the mouth of the user as compared with the other voice acquisition units, and
the second voice acquisition unit is provided closer to a feet side of the user than the first voice acquisition unit in an upright posture of the user.

(5)
The voice processing system according to (3) or (4),
wherein the first voice acquisition unit and the second voice acquisition unit are provided closer to a feet side of the user than the mouth of the user in an upright posture of the user.

(6)
The voice processing system according to any one of (2) to (5), wherein the voice acquisition unit is a microphone having omnidirectional sensitivity.

(7)
The voice processing system according to (6),
wherein the voice acquisition unit is a microphone whose sensitivity is uniform or substantially uniform in all directions.

(8)
The voice processing system according to any one of (2) to (7), further including:
a controller configured to perform beamforming processing of forming directivity for acquiring a voice coming from a direction of the mouth of the user using a plurality of voice data items acquired by the voice acquisition unit.

(9)
The voice processing system according to (8),
wherein the beamforming processing is a process of changing a degree of enhancement for each area where sound arrives.

(10)
The voice processing system according to (9),
wherein the beamforming processing includes a process of reducing sound coming from a specific area.

(11)
The voice processing system according to any one of (8) to (10),
wherein the controller controls the beamforming processing based on positional relationship between a noise source and the voice acquisition unit.

(12)
The voice processing system according to any one of (8) to (11),
wherein the controller controls the beamforming processing based on a position of a speaker other than the user.

(13)
The voice processing system according to any one of (8) to (12),
wherein the controller controls the beamforming processing based on information indicating a state of the user.

(14)
The voice processing system according to any one of (8) to (13),
wherein the controller performs processing in accordance with a result of voice recognition executed based on voice data subjected to the beamforming processing.

(15)
The voice processing system according to (14),
wherein the controller controls an operation of the voice processing system based on the result of the voice recognition.

(16)
The voice processing system according to (15),
wherein the controller controls the directivity based on the result of the voice recognition.

(17)
The voice processing system according to any one of (8) to (16),
wherein the mounting unit includes the controller.

(18)
The voice processing system according to any one of (2) to (17),
wherein the mounting unit is worn around a neck of the user.

REFERENCE SIGNS LIST 1 voice processing system
110 voice acquisition unit
120 image capture unit
130 operation unit
140 sensor unit
150 communication unit
160 controller

The invention claimed is:

1. An apparatus comprising:
a wearable neckband type mounting unit, which when worn around a neck of a user, curves around the neck from a right side of the neck and from a left side of the neck, towards a back side of the neck;
a first voice acquisition unit configured to be provided on a first face of the wearable neckband type mounting unit that opposes a face of the wearable neckband type mounting unit facing a shoulder of the user; and
a second voice acquisition unit configured to be provided on a second face of the wearable neckband type mounting unit that opposes a face of the wearable neckband type mounting unit facing the neck,
wherein the first face and the second face are different faces of the wearable neckband type mounting unit,
wherein the first voice acquisition unit is orientated in a direction more toward a mouth of the user in comparison to an orientation direction of the second voice acquisition unit,
wherein the orientation direction of the second voice acquisition unit is orientated in a direction more toward to a leg of the user in comparison to the direction of the orientation of the first voice acquisition unit, and
wherein the first voice acquisition unit and the second voice acquisition unit are each implemented via circuitry.

2. The apparatus according to claim 1, wherein the wearable neckband type mounting unit is formed of a rigid material having a curved shape with an open gap.

3. The apparatus according to claim 1, wherein the wearable neckband type mounting unit is shaped to make at least a half turn around the neck from the right and left sides of the neck, to the back side of the neck.

4. The apparatus according to claim 1, further comprising:
a controller configured to acquire a voice coming from the user using voice data acquired by the first voice acquisition unit and the second voice acquisition unit,
wherein the controller is implemented via at least one processor.

5. The apparatus according to claim 1, further comprising:
a communication unit configured to communicate with another apparatus by a wireless connection and transmit the acquired voice to the another apparatus,
wherein the communication unit is implemented via at least one processor.

6. The apparatus according to claim 5, wherein the communication unit communicates with the another apparatus by using Bluetooth™.

7. A voice processing system comprising:
a wearable neckband type mounting unit, which when worn around a neck of a user, curves around the neck from a right side of the neck and from a left side of the neck, towards a back side of the neck;
a first voice acquisition unit configured to be provided on a first face of the wearable neckband type mounting unit that opposes a face of the wearable neckband type mounting unit facing a shoulder of the user; and
a second voice acquisition unit configured to be provided on a second face of the wearable neckband type mounting unit that opposes a face of the wearable neckband type mounting unit facing the neck,
wherein the first face and the second face are different faces of the wearable neckband type mounting unit,
wherein the first voice acquisition unit is orientated in a direction more toward a mouth of the user in comparison to an orientation direction of the second voice acquisition unit,
wherein the orientation direction of the second voice acquisition unit is orientated in a direction more toward to a leg of the user in comparison to the direction of the orientation of the first voice acquisition unit, and
wherein the first voice acquisition unit and the second voice acquisition unit are each implemented via circuitry.

8. The voice processing system according to claim 7, wherein the wearable neckband type mounting unit is formed of a rigid material having a curved shape with an open gap.

9. The voice processing system according to claim 7, wherein the wearable neckband type mounting unit is shaped to make at least a half turn around the neck from the right and left sides of the neck, to the back side of the neck.

10. The voice processing system according to claim 7, further comprising:
   a controller configured to acquire a voice coming from the user using voice data acquired by the first voice acquisition unit and the second voice acquisition unit,
   wherein the controller is implemented via at least one processor.

11. The voice processing system according to claim 7, further comprising:
   a communication unit configured to communicate with another apparatus by a wireless connection and transmit the acquired voice to the another apparatus,
   wherein the communication unit is implemented via at least one processor.

12. The voice processing system according to claim 11, wherein the communication unit communicates with the another apparatus by using Bluetooth™.

* * * * *